United States Patent [19]

Machelski

[11] Patent Number: 5,622,082
[45] Date of Patent: Apr. 22, 1997

[54] BALL NUT AND SCREW ASSEMBLIES WITH IMPROVED CROSSOVERS

[75] Inventor: Mitchell A. Machelski, Saginaw, Mich.

[73] Assignee: Thomson Saginaw Ball Screw Company, Inc., Saginaw, Mich.

[21] Appl. No.: 517,741

[22] Filed: Aug. 22, 1995

[51] Int. Cl.$^6$ .................................................. F16H 25/22
[52] U.S. Cl. .......................... 74/459; 74/424.8 R
[58] Field of Search ........................... 74/424.8 R, 459

[56] References Cited

U.S. PATENT DOCUMENTS

| | | | |
|---|---|---|---|
| 2,618,166 | 11/1952 | Douglas | 74/459 |
| 2,995,948 | 8/1961 | Galonska et al. | 74/459 |
| 3,512,426 | 5/1970 | Dabringhaus | 74/459 |
| 3,580,098 | 5/1971 | Goad | 74/459 |
| 3,815,435 | 6/1974 | Eschenbacher et al. | 74/459 |
| 3,961,541 | 6/1976 | Fund et al. | 74/459 |
| 4,148,226 | 4/1979 | Benton | 74/459 |
| 4,272,476 | 6/1981 | Wright et al. | 335/128 |
| 4,905,534 | 3/1990 | Andonegui | 74/459 X |
| 5,121,647 | 6/1992 | Teramachi | 74/89.15 |
| 5,193,409 | 3/1993 | Babinski | 74/89.15 |

FOREIGN PATENT DOCUMENTS

| | | | |
|---|---|---|---|
| 103316 | 3/1984 | European Pat. Off. | 74/459 |
| 2703122 | 9/1994 | France | 74/459 |

*Primary Examiner*—Allan D. Herrmann
*Attorney, Agent, or Firm*—Learman & McCulloch

[57] ABSTRACT

A crossover button, in combination with a ball nut and screw assembly, has a generally Z-shaped body with a section received within a radial bore in the nut. The body has an axially diagonal, raceway turn bridging, ball crossover recirculation passage in its radially inner face which separates portions of a pair of adjacent raceway turns into ball path portions and non-ball path portions external to the ball path portions. The passage has entrances for different turns communicating with the ball path portions. Incorporated with the body are a pair of oppositely helically extending, integrated, normally non-load bearing legs, projecting laterally in a direction away from the passage entrances adjacent opposite ends of the passage in generally parallel lateral planes, which are received in the adjacent non-ball path portions of both the complemental nut and screw helicoidal grooves out of the path of the train of load bearing balls to function to prevent free-wheeling in the event of ball train failure.

3 Claims, 2 Drawing Sheets

BALL NUT AND SCREW ASSEMBLIES WITH IMPROVED CROSSOVERS

The present invention relates to ball screw mechanisms wherein a train of load bearing balls is disposed in complementary helicoidal grooves formed in a nut and screw which comprise a raceway for the recirculating balls. In such mechanisms, rotation of one member relative to the other results in relative axial movement with only rolling friction between the screw and nut members.

BACKGROUND OF THE INVENTION

Typically, so called crossover buttons of the general type disclosed in the Douglas U.S. Pat. No. 2,618,166 have been employed to return the balls in the adjacent turns of the raceway when the length of the raceway is slightly less than one helical turn of the complementary grooves in the nut and screw. Buttons or guides of the type disclosed in the Douglas patent have comprised substantially U-shaped liners inserted into an aperture provided through the nut wall to lie wholly within the confines of the nut wall, and have incorporated deflecting elements which extend to deflect the balls into the liner. Such liners or guides have further incorporated projections extending from opposite sides of the guide which are positioned wholly within the groove in the nut to hold the guide in position so that deflection of the balls into and out of the channel can occur.

In addition to the foregoing patents which I incorporate herein by reference, load path inserts are in use in the industry which are assembled in the nut and have oppositely extending ball deflector legs for nuts with external ball return tubes. Such deflector legs extend into the groove in the screw to provide what is termed load path redundancy. Should all bearing balls be lost, the nut, for instance, will not free wheel to permit damage to the machinery which is being operated by the ball screw and nut assemblies. For example, when the ball screw and nut assembly is being used in a jack and a load is being supported, the load path redundancy inserts act like acme threads to prevent the nut or screw from free wheeling and the load from dropping rapidly due to gravitational forces. In some cases, as disclosed in the Galonska et al U.S. Pat. No. 2,995,948, deflector springs in the form of wire coil elements have been utilized. During normal operation these inserts, which have a cross section slightly smaller than the bearing ball diameter, are allowed to float radially and axially. Where extreme reliability is required, such as in aerospace applications, multiple redundant load path inserts are used in each ball screw assembly.

SUMMARY OF THE INVENTION

The present invention provides a ball nut and screw assembly wherein complementary helicoidal grooves having adjacent turns are provided in both the ball nut and the screw to define a raceway for a train of abutting balls. A generally Z-shaped body having a section received within a bore in the nut is provided with an axially diagonal, turn bridging ball crossover passage in its radially inner face. The passage has entrances at opposite ends in communication with different turns and, further, has a pair of oppositely extending integrated curvilinear legs projecting laterally from the body section opposite each of said entrances and in alignment therewith. At the side of each entrance, these legs curve away from the body to seat in the helicoidal groove of the screw to function to prevent free wheeling in the event of ball train failure.

One of the prime objects of the present invention is to provide a crossover button structure with integrated legs which are positioned to extend to seat in the helicoidal groove and prevent freewheeling when it is necessary to do so.

Still another object of the invention is to provide a crossover mechanism which achieves load path redundancy and provides an extremely safe construction which allows the ball screw to operate as though it had an Acme thread, to prevent disassembly of the components should the balls be lost.

Still a further object of the invention is to provide a crossover construction which avoids the need for manufacturing and installing separate load path inserts to provide the required load path redundancy.

Still a further object of the invention is to accomplish the foregoing objects by so constructing the crossover mechanism that it can be held in position by press fitting it into position without the need for fastening members or means.

Still a further object of the invention is to design a ball screw and nut assembly of the character described which is highly efficient and reliable, and can position mechanical components with extreme accuracy, and so finds myriad uses in a great variety of applications.

Still a further object of the invention is to design a ball screw and nut assembly wherein all of the parameters which must be considered in providing multiple redundant load paths are taken into consideration, and a long lived, wear resistant design results.

Another object of the invention is to provide a durable mechanism of the character described which can be very economically produced by casting or machining, and very readily assembled in position.

THE DRAWINGS

The presently preferred embodiment of the invention is disclosed in the following description and in the accompanying drawings, wherein.

DETAILED DESCRIPTION

It is to be understood that FIGS. 1–4 particularly are schematic views which are not of a precise nature and are included only to show the general device.

Figure 1:
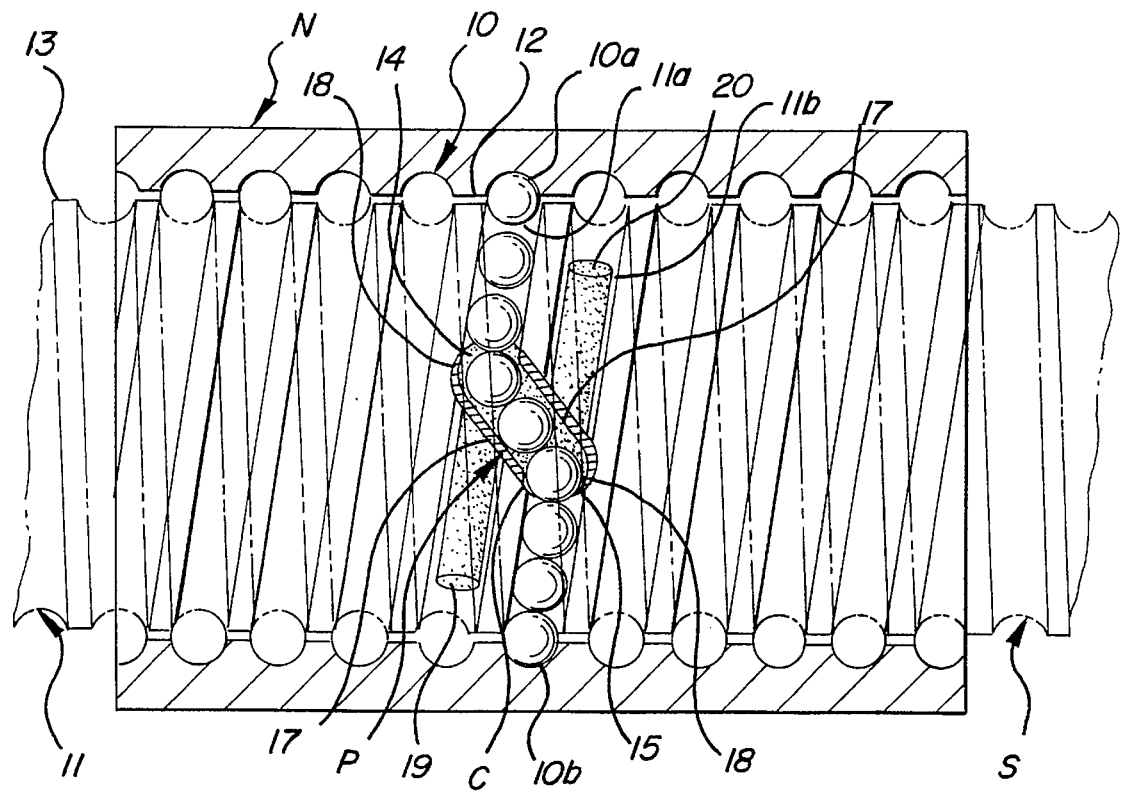
FIG. 1 is a schematic sectional top plan view illustrating the general manner in which the recirculating balls travel in a typical ball nut and screw assembly.

In FIG. 1, the nut, generally designated N, is shown as having a helicoidal groove generally designated 10 which is of the same pitch or lead as the helicoidal groove generally indicated 11 formed in the screw S. The helicoidal groove 10 defines a helical land or thread 12 on the interior wall of the nut end sleeve, similarly, the helical groove 11 defines a land 13 on the screw S. Lands 12 and 13 are separated by an operating clearance "cl". Provided to provide a recirculating passageway for a train of balls B between adjacent turns 10*a* and 10*b* of the nut groove 10 is a crossover mechanism button, or body, generally designated C, which functions as an internal ball return device. While, for purposes of convenience in FIG. 1, only a single crossover device C is shown in use, it is to be understood that in a nut of the axial length shown, a plurality of such crossover mechanisms C would be employed at axially spaced locations.

Figure 2:
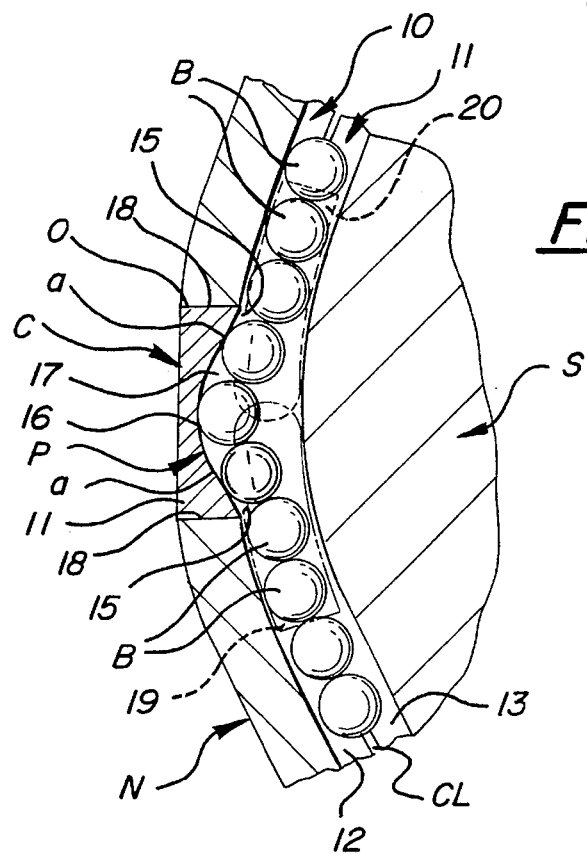
FIG. 2 is an enlarged fragmentary schematic transverse sectional view further illustrating the travel of the recirculating balls.
Figure 3:
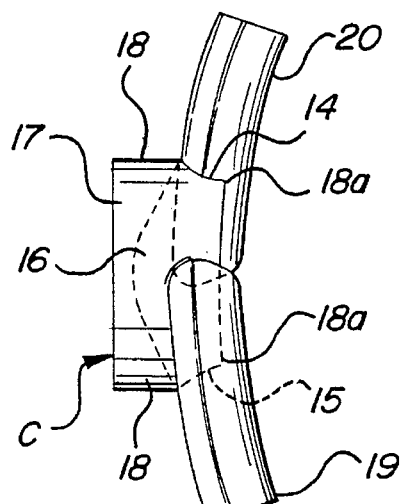
FIG. 3 is a schematic side elevational view of the crossover button only.
Figure 4:
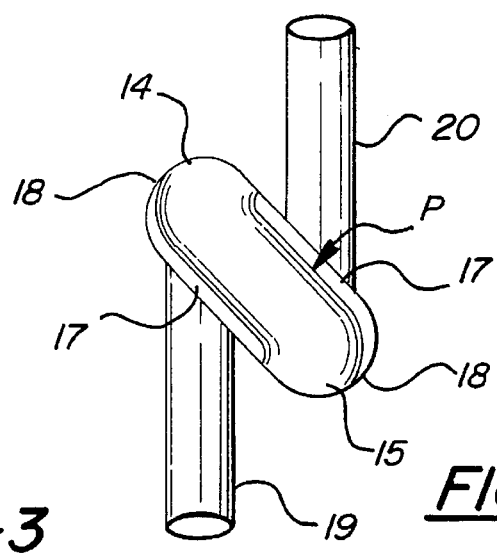
FIG. 4 is an under plan view thereof.

Crossover mechanisms of this character include a generally S shaped (FIG. 4) open interior passage or channel, generally designated P, which, when the mechanism C is in place, extends diagonally relative to the axes of the nut and screw to bridge the adjacent nut groove turns 10*a* and 10*b*. The passageway or channel P has an opening 14 which communicates with the groove portion 10*a* of the nut and an opening 15 which communicates with the portion 10*b* of the nut groove. Each opening 14 and 15 may be termed an entrance or discharge opening depending on which direction the balls B are traveling. The mediate or central portion of the channel or passageway P, which has radially inwardly angled end portions as shown in FIG. 2 at "a", is enlarged radially sufficiently as at 16 to permit the train of balls B to travel up and over the land 13 of the screw and proceed from one of the passage openings 14 to the other passage opening 15 and vice versa.

It is to be understood that the balls B are in abutting relation and move continuously in a recirculating path when the nut end and screw S are relatively moved. The crossover button or device C is generally U-shaped in crossectional configuration to provide a top wall 16 and side walls 17. The body C also has end walls 18 with projecting portions 18*a* which extend inwardly to form deflectors as shown. The end wall portions 18 terminate radially adjacent the screw land or crest 13 and direct balls over the screw land 13 into the transfer passage or port P to pass from one nut groove turn to the adjacent nut groove turn. Thus far the crossover button mechanism operates in the same manner as previously to recirculate the ball train in the usual manner. The body C is, however, capable of being press fitted into position in the opening or radial bore O provided in the nut wall to snugly receive it.

Provided at each end of the crossover body C in predetermined positions are legs 19 and 20. The legs 19 and 20 extend helically from the sidewalls 17 of the body C to provide the entire crossover device with a Z-shape in plan and underplan view (FIG. 4) and are received in the screw groove 11 and, as FIG. 2 shows, extend also into the nut groove 10. The legs 19 and 20 curve outwardly at radii taken from the center or axis of screw S. In FIGS. 5–8 more finished drawings of the crossover mechanism are shown. As FIG. 6 clearly indicates, the top wall 17*a* of the body C is domed and the legs 19 and 20 extend nearly radially parallelly to conform to the pitch of the adjacent turns 11*a* and 11*b* of the screw groove 11. The crossover device separates the turns 11*a* and 11*b* into non-ball path portions in which no balls circulate and ball path portions in which the balls circulate. The screw legs 19 and 20 extend at the pitch angle of the nut groove 11 and are sized with sufficient clearance to avoid the imposition of undue friction. The crossover buttons disclosed herein with legs of elliptical cross-section are utilized in connection with a ball groove which has a four inch ball circle diameter, a 0.333 inch lead, a 1.52° helix angle, and a 0.250 diameter ball, with the scale set up in the drawing as 2:1.

THE OPERATION

Figure 5:
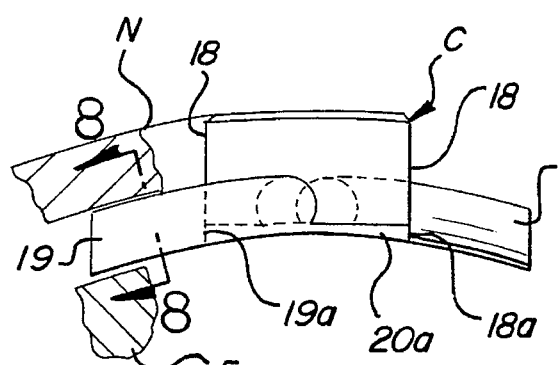
FIG. 5 is a side elevational view of a more finished embodiment.
Figure 7:
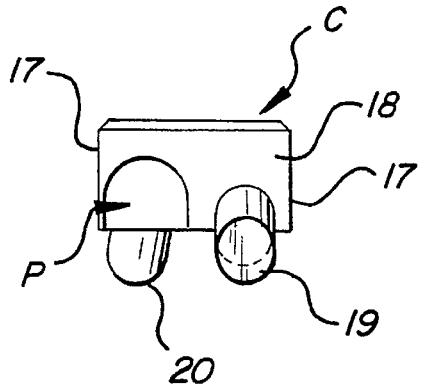
FIG. 7 is an end elevational view thereof.
Figure 6:
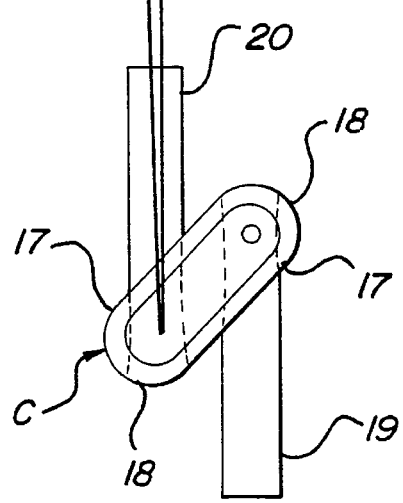
FIG. 6 is a top plan view thereof.
Figure 8:
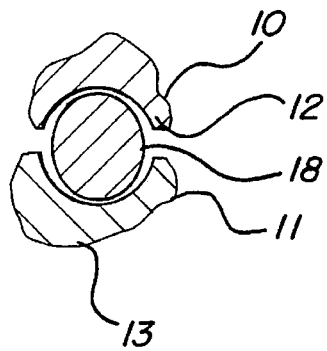
FIG. 8 is a transverse sectional view through one of the redundancy legs provided on the crossover button.

From FIGS. 5 and 6 it will be apparent that the side and end walls 17 and 18 of the crossover button body C must clear the screw lands 13 so as not to interfere with the operation of the screw S. The balls are forced upwardly into the passage P when they encounter the portions of side walls 17 and end walls 18 which are in their path and extend down into the ball groove 10. Typically these deflector portions extend radially inwardly sufficient to just pass beyond the center of the balls traveling in the nut and screw grooves 10 and 11, respectively, to prevent binding. And there is a free circulation of balls between the ball path portions 10*a* and 10*b* of the nut groove 10 when the balls are traveling in one direction or the other through the passageway P. The balls B are the load transferring portions of the assembly and transmit motive force between the screw S and nut N. The legs 19 and 20 are freely received in the grooves 10 and 11, as FIG. 2 indicates, and are non load-bearing when the balls B are recirculating in normal operation. For this purpose, the clearance around the legs 19 and 20 will be slightly greater relative to grooves 10 and 11 than the clearance of balls B in the grooves 10 and 11. For example, when the balls B are 0.250 inches in diameter, the legs 19 and 20 which are generally elliptical in cross-section (FIG. 9) and will typically have a radial height of 0.211 inches in diameter and a width of 0.188 inches. It is only when the function of the train of balls B is substantially destroyed, and the nut and screw would otherwise freewheel, that the legs 19 and 20 become operative to slow and control this relative motion. It will be observed from studying FIG. 5 that the legs 19 and 20, at their radially inner surfaces project below the side walls 17.

The disclosed embodiment is representative of a presently preferred form of the invention, but is intended to be illustrative rather than definitive thereof. The invention is defined in the claims.

I claim:

1. A crossover button in combination with a ball nut and screw assembly comprising an axially extending screw with external lands defining a helicoidal groove having adjacent turns; a ball nut thereon with internal lands defining a complemental helicoidal groove with complemental turns, the helicoidal grooves of the screw and nut defining a raceway with substantially semi-circularly shaped groove surfaces in the screw and nut separated by an operating clearance between the nut and screw lands; and a train of abutting load bearing balls being received with an operating clearance within said raceway to ride on said groove surfaces, the nut having a radial bore extending through to said raceway, and the button comprising;

a) a generally Z-shaped body, having a section received within said bore, the body being provided with an axially diagonal, turn-bridging, ball crossover recirculation passage in its radially inner face which separates portions of a pair of adjacent turns into ball path portions and non-ball path portions external to said ball path portions, said passage having entrances for different turns communicating with said ball path portions;

b) said body having a pair of oppositely helically extending, integrated, normally non-load bearing legs projecting laterally in a direction away from said passage entrances adjacent opposite ends of said passage, said legs curving away from said body inwardly toward said screw in conformance with said screw groove when said body section is in place in said bore, said legs being of substantially elliptical cross-section with a major axis in the radial direction and being of a dimension to be received in and substantially fill, except for a surrounding clearance, the combined volume of said adjacent non-ball path portions of both the nut and screw helicoidal grooves in which they are received to function to confront substantially the entire groove surfaces over a substantial portion of the extent of said legs to transmit load and prevent free-wheeling in the event of ball train failure; the clearance around the legs being slightly greater than the clearance around said balls.

2. The combination of claim 1 wherein said passage has a central portion and radially inwardly angled portions extending therefrom to deliver said balls from said ball path portion of one turn to the ball path portion of an adjacent turn.

3. The combination of claim 2 wherein said passage is generally S-shaped in configuration.

* * * * *